United States Patent [19]
Valis

[11] 3,928,798
[45] Dec. 23, 1975

[54] MEANS FOR FREQUENCY/DIGITAL CONVERSION

[75] Inventor: Jaroslav Valis, Vasteras, Sweden

[73] Assignee: Allmanna Svenska Elektriska Aktiebolaget, Vasteras, Sweden

[22] Filed: Oct. 7, 1974

[21] Appl. No.: 512,624

[30] Foreign Application Priority Data
Nov. 22, 1973 Sweden............................... 7315792

[52] U.S. Cl................ 324/78 D; 307/220; 307/221; 307/225
[51] Int. Cl.$^2$........................................ G01R 23/02
[58] Field of Search .......... 324/78 D; 307/220, 221, 307/225

[56] References Cited
UNITED STATES PATENTS

| | | | |
|---|---|---|---|
| 3,801,906 | 4/1974 | Harris................................ | 324/78 D |
| 3,803,486 | 4/1974 | Russell et al...................... | 324/78 D |
| 3,842,347 | 10/1974 | Terbrack........................... | 324/78 D |

Primary Examiner—John Kominski

[57] ABSTRACT

An arrangement for frequency/digital conversion, particularly for digital revolution and speed measuring, includes a clock unit, a control unit, and a counter unit. The clock unit provides a pulse train with a constant frequency. A multiplying unit is provided which gives a second pulse train, the frequency of which is dependent on the product of the constant frequency and the latest maximum value of the contents of the counter unit. The contents of the counter unit are reduced by a first quantity upon each pulse of the second pulse train. Another unit is arranged to supply the control unit with a third pulse train with an unknown frequency. The control unit emits a control signal to the counter unit for each pulse in the third pulse train. The counter unit increases its contents by a second quantity at the occurrence of such control signal. The second quantity is greater than or equal to the first quantity. After each such addition, the contents of the counter unit reach a new maximum value which constitutes a digital representation of the frequency of the second pulse train.

5 Claims, 4 Drawing Figures

MEANS FOR FREQUENCY/DIGITAL CONVERSION

BACKGROUND OF THE INVENTION

1. Field of the Invention

The present invention relates to a means for frequency/digital conversion.

2. The Prior Art

Digital angular velocity speed measuring is usually carried out by methods which are based on speed/frequency conversion by means of a pulse emitter mounted on, for example, an engine shaft, said pulse emitter generating a certain number of pulses per revolution, the output frequency being proportional to the number of revolutions per time unit. The frequency is then converted into numbers which are represented by a certain content in a counter. After counting, the contents of the counter unit are a direct measure of the speed.

A method like this involves a high resolution, accuracy of measurement, a high time and temperature stability due to a crystal-controlled time basis.

In order to obtain a resolution of, e.g., 0.1 by means of such a method, 10,000 measuring pulses must be counted at full speed. If the pulse emitter gives 10 kHz at this speed, the time of counting will be 1 second.

For control purposes this measuring speed is insufficient since a step change of the measuring frequency in the worst case is not indicated until after two measuring periods, i.e., after 2 seconds. For control purposes a time of counting which amounts to about 20 milliseconds is an often required time of counting. A speed indication which is performed according to the method described above must be complemented with a DC tachogenerator equipment for such applications, which makes the method complicated and expensive.

SUMMARY OF THE INVENTION

By means of a device for frequency/digital conversion according to the invention a speed indication can be performed with the desired speed at the high resolution desired by using an ingenious combination of available standard components.

The invention comprises an arrangement for frequency-digital conversion, particularly for digital revolution and speed measuring, the arrangement including a clock unit, a control unit, and a counter unit. The clock unit includes means to provide a pulse train with a constant frequency. A multiplying unit includes means to provide a second pulse train, the frequency of which is dependent on the product of the constant frequency and the latest maximum value of the contents of the counter unit. Means are provided to reduce the contents of the counter unit by a first quantity in response to each pulse of the second pulse train. Means are also provided to supply the control unit with a third pulse train with an unknown frequency. The control unit emits a control signal to the counter unit for each pulse in the third pulse train. The counter unit contents are increased by a second quantity at the occurrence of such control signal, the second quantity being greater than or equal to the first quantity. After each such addition, the contents of the counter unit reach a new maximum value which constitutes a digital representation of the frequency of the second pulse train.

BRIEF DESCRIPTION OF THE DRAWINGS

The invention will be described more fully with reference to the accompanying drawings, in which.

DESCRIPTION OF THE PREFERRED EMBODIMENTS

Figure 1:
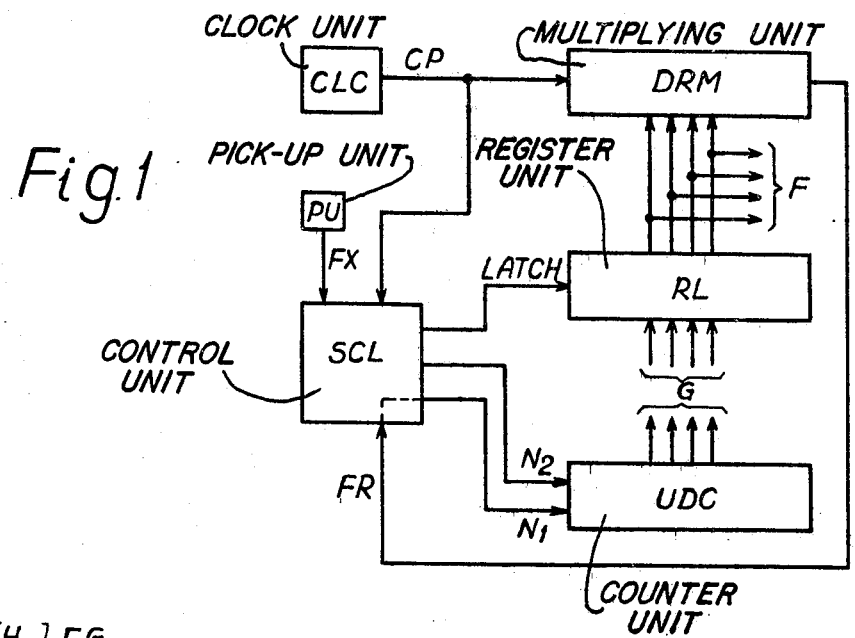
FIG. 1 shows the principle of a device according to the invention, FIG. 2 an embodiment of the principle shown in FIG. 1, FIG. 3 the connection between signals derived from the embodiment according to FIG. 2, and FIG. 4 in graphic representation the result of a case study to which the means according to the invention has been applied.

According to the embodiment shown in FIG. 1, the means according to the invention consists of a clock unit CLC arranged to deliver a pulse train CP with a specified clock frequency $f_c$, a synchronization and control unit SCL to which an unknown pulse train FX with the frequency $f_X$ is supplied from a pick-up unit PU and into which the pulse train CP from the the clock unit CLC is fed, a counter unit UDC to which there is fed a first control signal $N_2$ from the synchronization and control unit SCL, a register unit RL which is connected to the counter unit UDC with a plurality of connections for transmitting the contents G in the counter unit UDC, and which may be influenced by the synchronization and control unit SCL by means of a second control signal LATCH, and a digital frequency-multiplying unit DRM into which the pulse train CP from the clock unit CLC and the contents F in the register unit RL are fed by means of several connections, the digital frequency-multiplying unit DRM emitting a pulse train FR arranged to influence the contents of the counter unit UDC with a third control signal $N_1$ by way of the synchronization and control unit SCL.

First of all a theoretical description of the operation will be given in connection with FIG. 1, and then follows a detailed description of the operation in connection with FIG. 2.

The output signal from the multiplying unit DRM, i.e., the pulse train FR, the frequency of which $f_R$ is proportional to the product of the frequency $f_C$ of the pulse train CP delivered from the clock unit CLC and the contents F of the register unit RL according to the formula $$f_R = \frac{f_c \cdot F}{M} \qquad (1)$$

where $1/M$ is a proportionality constant and where $0 \leq F < M$.

Figure 3:
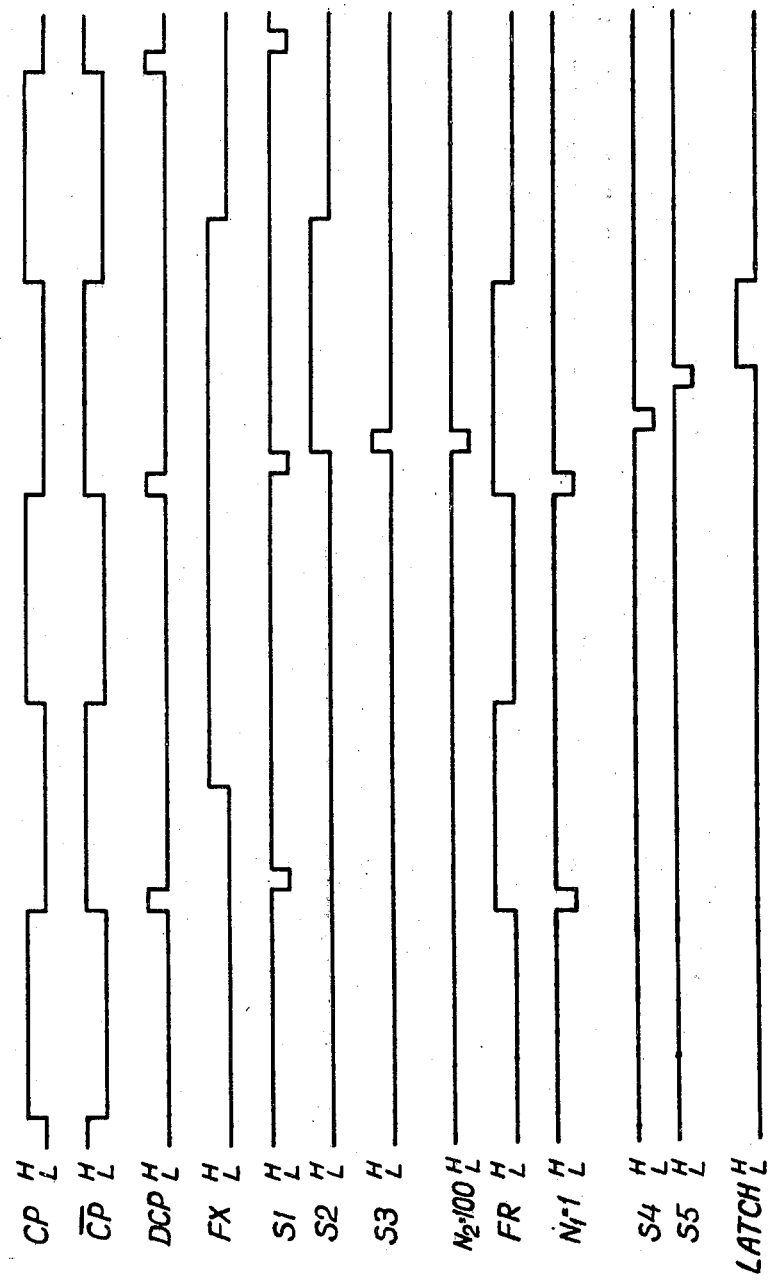

For each pulse in the pulse train FR the contents of the counter unit UDC are reduced by $N_1$ units. After each pulse in the unknown pulse train FX with the frequency $f_X$, the synchronization and control unit SCL first generates a control signal $N_2$ to the counter unit UDC, after which its contents G are increased by $N_2$ units, and thereafter a second control signal LATCH to the register unit RL, the contents G in the counter unit UDC being transmitted to the register unit RL. The synchronization and control unit SCL then controls the times of said subtraction and addition so that these do not coincide. Addition of $N_2$ units and transmission of the contents G thus take place between two pulses in the pulse train CP. See further FIG. 3 and therein the relations between the pulse trains CP, FX, $N_2$, FR, $N_1$ and LATCH.

Figure 4:
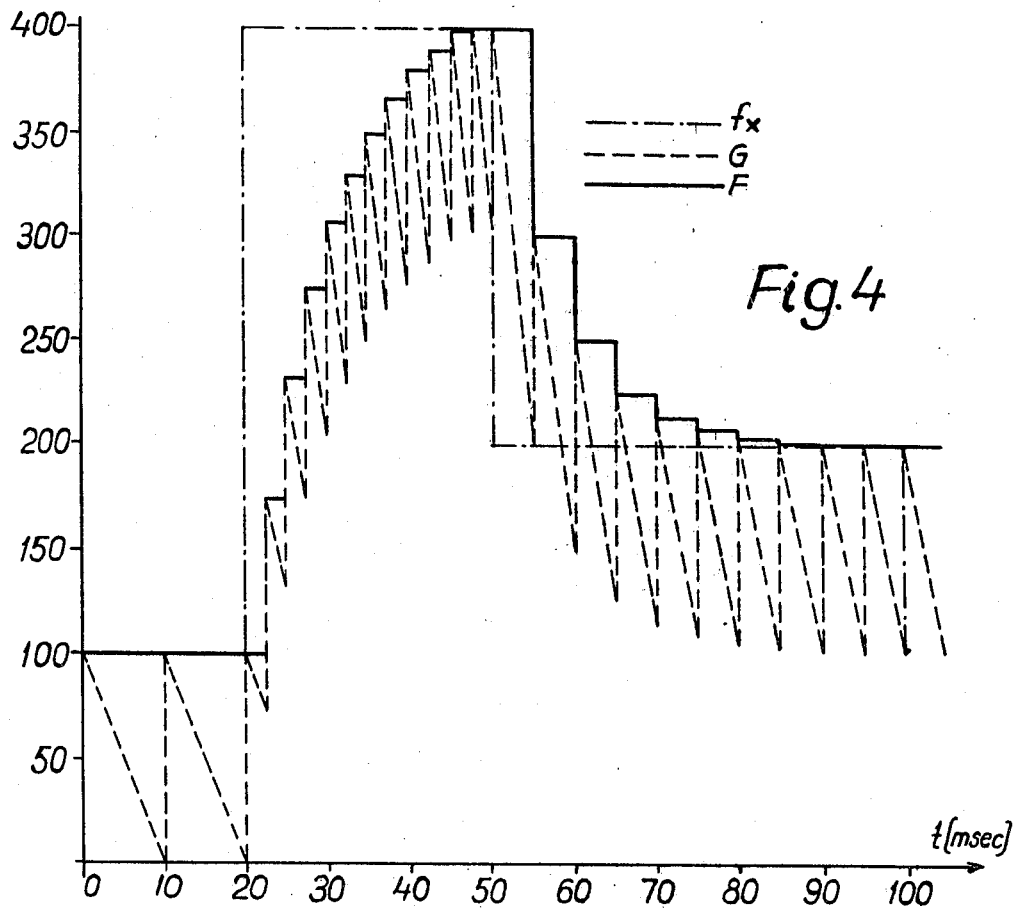

FIG. 4 further illustrates the relation between the quantities F and G for different frequencies $f_X$ when $M = 10,000$, $N_1 = 1$, $N_2 = 100$ and $f_C = 1$ MHz.

During a period $T_X$ of the unknown frequency $$f_X = \frac{1}{T_X}$$

the contents of the counter unit UDC decrease gradually (when $N_1 = 1$) by $f_R \cdot T_X$ in total and are then increased by $N_2$.

If the contents of the register unit RL at the beginning of the k'th period of the unknown frequency $f_X$ are designated $F_k$, the following applies:

$$F_{k+1} = F_k - f_R \cdot T_X + N_2 = F_k - \frac{f_R}{f_X} + N_2. \qquad (2)$$

Now, if the equations (1) and (2) are put together the following is obtained $$F_{k+1} = F_k \left(1 - \frac{f_C}{f_X \cdot M}\right) + N_2 \qquad (3)$$

If $f_C$ is constant and $$\left|1 - \frac{f_C}{f_X \cdot M}\right| < 1, \text{ i.e.}$$

$$f_X > \frac{f_C}{2M} = f_{Xmin}'' \qquad (4)$$

then $F_k$ converges from the equation (3) towards $F$ according to $$F = \lim_{k \to \infty} F_k = \frac{N_2 \cdot M}{f_C} \cdot f_X, \qquad (5)$$

i.e., the contents $F$ of the register unit RL are proportional to the unknown frequency $f_X$.

Furthermore, if $$1 - \frac{f_C}{f_X \cdot M} \geq 0, \text{ i.e. if}$$

i.e., if $$f_X \geq \frac{f_C}{M} = f_{Xmin} \qquad (6)$$

the convergence is monotonous.

An alteration $\Delta F_k$ of $F$ from the equation (2) during the k:th period of the frequency $f_X$ results in $$\Delta F_k = F_{k+1} - F_k = N_2 - \frac{f_C}{f_X} \cdot \frac{F_k}{M} \qquad (7)$$

This alteration $\Delta F_k$ takes place during the period $T_X$. For $T_X \to 0$, i.e., $$f_X \to \infty, \quad \frac{\Delta F_k}{T_X} \to \frac{dF_k}{dt}$$

is obtained, and the dynamic behaviour of the means according to the invention can be approximately described by the differential equation $$\frac{dF}{dt} = f_X \cdot N_2 - \frac{f_C}{M} \cdot F \qquad (8)$$

which has a solution $$F(t) = \frac{M \cdot N_2}{f_C} \cdot f_X (1 - e^{-\frac{f_C}{M} \cdot t}) \qquad (9)$$

and for $t \to \infty$ the following is obtained $$F(\infty) = \frac{M \cdot N_2}{f_C} \cdot f_X = F \qquad (10)$$

The quotient $$\frac{f_C}{M}$$

according to the equation (9) corresponds to the inverse value of the time constant of the exponential function, namely $$\tau_M = \frac{M}{f_C} \qquad (11)$$

It can be noted in this context that $F$, i.e., the contents of the register unit RL, for high frequencies converges exponentially towards $$\frac{M \cdot N_2}{f_C} \cdot f_X$$

with the time constant $$\tau_M = \frac{M}{f_C}.$$

From the equations (11) and (6) the following is obtained $$\tau_M = \frac{1}{f_{Xmin}} = T_{Xmax}. \qquad (12)$$

i.e., the time constant $\tau_M$ is equal to the period $T_{Xmax}$ for the lowest measuring frequency giving monotonous convergence.

The convergence process in case of lower frequencies deviates from the exponential process the more $f_X$ approaches $f_{Xmin}$. However, a correct measuring value is obtained as quickly as in the case of high frequencies, i.e., during a time corresponding to 3 to 5 times $\tau_M$.

For a practical case illustrated in FIG. 4 a resolution of $F$ is obtained with $0.1_{o/oo}$, $\tau_M = 10$ msec, lowest measuring frequency for monotonous convergence $f_{Xmin} = 100$ Hz, lowest measuring frequency for stable convergence $f_{Xmin}{}^H = 50$ Hz, where maximum measuring frequency was 9999 Hz and the measuring range $$\frac{f_{Xmax}}{f_{Xmin}} = 100.$$

Figure 2:
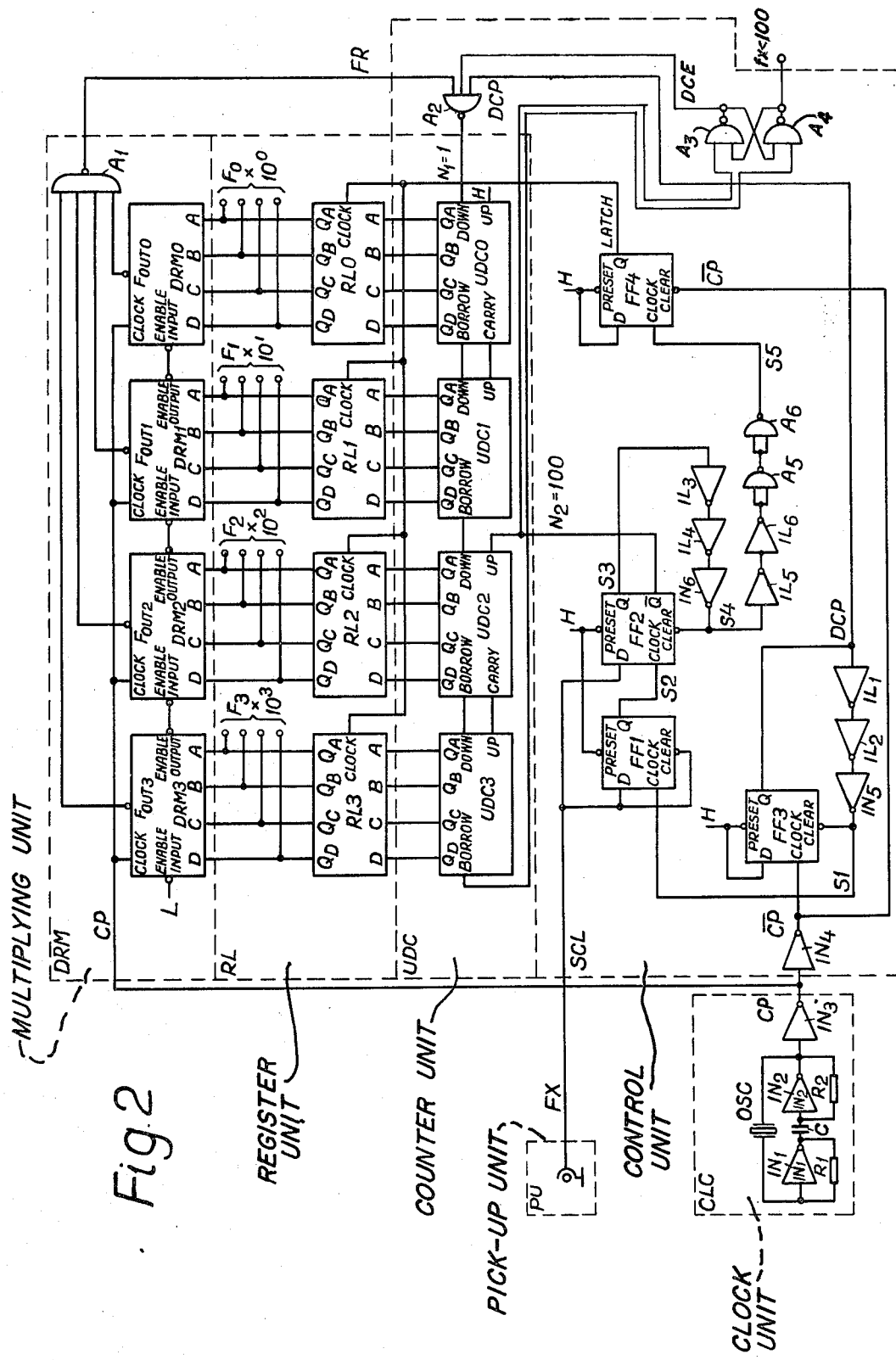

FIG. 2 shows a specific embodiment of the arrangement according to FIG. 1.

The clock unit CLC comprises a crystal-controlled oscillator OSC and a number of inverters $IN_1$, $IN_2$ and $IN_3$ with additional elements $R_1$, $R_2$ and C. The inverter $IN_3$ and the inverter $IN_4$ included in the synchronization and control unit SCL amplify and convert the output signal from the oscillator into a square-shaped pulse train CP and $\overline{CP}$, respectively. See FIG. 3 which describes the time relations between the pulse trains mentioned below.

The digital frequency multiplication DRM consists of four cascade-connected multiplication elements DRM0, DRM1, DRM2 and DRM3 and a NAND gate $A_1$. The cascade connection is brought about by the connection between the ENABLE INPUTS and ENABLE OUTPUTS, respectively, of the respective multiplication elements.

Each multiplication unit is supplied to the pulse train CP and is connected, by way of its inputs A, B, C and D, to the respective inputs $Q_A$, $Q_B$, $Q_C$ and $Q_D$ of the 4-bit register elements RL0, RL1, RL2 and RL3 of the register unit RL. Each multiplication unit DRM0, DRM1, DRM2 and DRM3 generates a pulse train $F_{OUT0}$, $F_{OUT1}$, $F_{OUT2}$ and $F_{OUT3}$, respectively, the average frequencies of which are $f_{OUT3} = F_3 \cdot 0.1 f_C$
$f_{OUT2} = F_2 \cdot 0.01 f_C$
$f_{OUT1} = F_1 \cdot 0.001 f_C$
and
$f_{OUT0} = F_0 \cdot 0.0001 f_C$ where $F_0$, $F_1$, $F_2$ and $F_3$ are the contents (preferably in BCD code) of the respective register elements RL0, RL1, RL2 and RL3 and $f_C$ the frequency of the pulse train CP.

Negative output signals $\overline{F}_{OUT0}$, $\overline{F}_{OUT1}$, $\overline{F}_{OUT2}$ and $\overline{F}_{OUT3}$ are added by means of the NAND gate $A_1$ into a pulse train FR, the average frequencies of which are $f_R = f_{OUT3} + f_{OUT2} + f_{OUT1} + f_{OUT0} = f_C (0.1 F_3 + 0.01 F_2 + 0.001 F_1 + 0.0001 F_0)$.

The counter unit UDC consists of four reversible counter elements UDC0, UDC1, UDC2 and UDC3. Each counter element has separate inputs for counting up and counting down, here UP and DOWN, respectively. A change in the condition of one counter element upwards or downwards is made at the positive-going edge of the respective input signal to UP or DOWN whereas the signnal on the second of UP or DOWN is high (logical one).

When counting up (down) a counting pulse is passed to the CARRY (BORROW) output when the state of the counter element is changed from 9 to 0 (0 to 9). This means that the counter elements can be cascade-connected by connecting a CARRY (BORROW) output to an UP (DOWN) input of the next counter element. The current state of each counter element is available on its $Q_A$-, $Q_B$-, $Q_C$- and $Q_D$-outputs which are connected to A-, B-, C- and D-inputs, respectively, of one register element each in the register unit RL.

According to the connection in FIG. 2 all counter elements UDC0 - UDC3 are cascade-connected for counting down $-1$ pulses on the DOWN input of the counter element UDC0. The UP input of UDC0 is connected to a high logical level H. Only the counter elements UDC2 and UDC3 are cascade-connected for counting up a pulse on the UP input of the counter element UDC2, which means that each counting down by $-1$ unit of the counter element UDCO reduces the contents of the entire counter unit UDC by 1, whereas each signal $N_2$ increases the contents of the entire counter by 100 units.

The synchronization and control unit SCL consists of four flip-flops FF1, FF2, FF3 and FF4, a number of inverters $IN_4$, $IN_5$, $IN_6$, $IL_1$, $IL_2$, $IL_3$, $IL_4$, $IL_5$ and $IL_6$, and NAND gates $A_2$, $A_3$, $A_4$, $A_5$ and $A_6$.

For each negative-going edge of the pulse train CP (i.e., for each positivegoing positive-going of the pulse train $\overline{CP}$) the output Q of the flip-flop FF3 is set to one, and its output signal DCP becomes high, i.e., a logical one. The signal DCP is delayed in inverters $IL_1$, $IL_2$ and $IN_5$ to the signal S1 which sets the flip-flop FF3, and thus also the signal DCP, to zero by way of the CLEAR input of the flip-flop FF3.

Accordingly, DCP becomes a positive pulse with a determined pulse length.

Through the NAND gate $A_2$ an inverted logical product is formed by the signal DCP, the output signal FR from the multiplication unit DRM and the signal DCE. (As regards DCE, see below.)

If the signal DCE is high and a pulse has been generated in the pulse train FR while a clock pulse period $T_C$ is in progress, a signal is obtained on the output of the NAND gate $A_2$ giving a negative pulse of the same length as the pulse of the signal DCP and reducing the contents of the counter unit UDC by 1 unit. If no pulse has been generated in the signal FR, the output signal from the NAND gate $A_2$ remains high and no subtractions are performed.

The subtraction as above is repeated as long as the contents of the counter unit UDC are positive. When the contents of the counter unit UDC become negative, i.e., 9999, a negative pulse is obtained on the BORROW output of the counter element UDC3, and the NAND gates $A_3$ and $A_4$ which are connected and operate as a flip-flop change the state of the output signal DCE and a further counting down of the counter unit UDC is stopped.

The signal FX, the frequency $f_X$ of which is to be converted, is presupposed to be converted into a pulse train with logical levels according to TTL logic.

When the signal FX is low the flip-flops FF1, FF2 and FF3 are set to zero, i.e., the signal $N_2$ from the Q-output of the flip-flop FF2 is high and the signal LATCH from the Q-output of the flip-flop FF4 is low. When the signal FX becomes high the flip-flop FF1 is set to one at the next positive-going edge of the signal S1, i.e., a certain time after the signal $N_1$ on the output from the NAND gate $A_2$ has become high and a unit has been subtracted from the counter unit UDC.

A high signal S2 on the Q-output of the flip-flop FF1 sets the flip-flop FF2 to one, and the signal of said flip-flop FF2 on the $\overline{Q}$-output, i.e., $N_2$, becomes low. After a certain time the flip-flop FF2 is set to zero by the fact that the signal S4, which is the output signal for the Q-output of the flip-flop FF2 which has been inverted and delayed by the inverters $IL_3$, $IL_4$ and $IN_6$, becomes low.

The signal $N_2$ is fed in at the UP-input of the counter element UDC2, the total contents of the counter element UDC2 and UDC3 increasing by one unit and, consequently, the contents of the whole counter unit UDC by 100. The signal $N_2$ also affects the flip-flop $A_3$-$A_4$ so that the signal DCE becomes high if this is not already the case.

The signal S4 is delayed in the inverters $IL_5$ and $IL_6$ and in the NAND gates $A_5$ and $A_6$ to the signal S5, said NAND gates being connected as inverters. The positive-going edge of the signal S5 sets the flip-flop FF4 to one when its D-input is high. The time delay of the signal S4 is longer than the time required for the counter elements UDC2 and UDC3 to change their conditions after the addition of 100 units.

When the flip-flop FF4 is set to one and the signal LATCH is high, the contents of UDC0, UDC1, UDC2 and UDC3 are transferred to their respective register units RL0, RL1, RL2 and RL3, and the register unit RL will therefore contain a new measuring value. The flip-flop FF4 and the signal LATCH will thus change to low level when the next pulse train CP shows a positive-going edge.

From the last-mentioned pulse onwards the multiplying unit DRM generates a pulse train with an average frequency commensurate to the new contents F of the register unit RL.

When the signal FX becomes low the flip-flop is set to zero, and thus the procedure decribed above is ready for repetition when the signal FX becomes high next time at the beginning of a new period of the measuring frequency $f_x$.

As pick up unit PU it is possible to use, for example, an AIRPAX Zero Velocity Digital Pickup Model 4-0001. The four multiplication elements DRM0-DRM3 may, for example, consist of four Texas Instruments SN 74167.

The four register elements RL0-RL3 may, for example, consist of four Texas Instruments SN 7475.

The four counter elements UDC0-UDC3 may, for example, consist of four Texas Instruments SN 74192.

The four flip-flops FF1-FF4 may, for example, consist of two Texas Instruments SN 7474.

The two NAND gates $A_1$ and $A_2$ may, for example, consist of a Texas Instruments SN 7420.

The four NAND gates $A_3$, $A_4$, $A_5$ and $A_6$ may, for example, consist of a Texas Instruments SN 7400.

The six inverters $IL_1$-$IL_6$ may, for example, consist of a Texas Instruments SN 74L04 and the six inverters $IN_1$-$IN_6$ of a Texas Instruments SN 7404.

The crystal in the crystal-controlled oscillator OSC may be of the HC-6 type.

The counter unit UDC and the multiplication unit DRM can also be adapted to operate with another code than the BCD shown here by replacing the respective elements with, for example, elements operating with a binary code, the ratio $N_1/N_2$ thus becoming a power of 16.

An arrangement according to the invention makes it possible to obtain a searched speed in digital form with sufficient rapidity, which also makes it possible to provide conducting and desired values within the desired control time and to form a control deviation with high precision and resolution, thus enabling a quick and simple speed control.

The arrangement according to the invention can be advantageously used as speed indicator instead of direct current tachogenerators in position servo systems with digital increment and absolute position measuring or with step motors.

An arrangement according to the invention also makes possible a quick an accurate measuring of very low frequencies. For a measuring range of 0.01–1 Hz and a resolution of 0.01 ´ , for example, a time of measuring of only 100 seconds is obtained with the means according to the invention, whereas conventional pulse counting would require 2.8 hours.

The arrangement according to the invention is of course not limited to the embodiment shown here, but can be varied in many ways within the scope of the following claims.

I claim:

1. Apparatus from frequency/digital conversion, especially for digital revolution and speed measuring, which comprises a clock unit (CLC), a control unit (SCL), and a counter unit (UDC), the clock unit (CLC) including means to deliver a first pulse train (CP) with a constant frequency ($f_C$), in which the apparatus comprises a multiplying unit (DRM) including means to deliver to the control unit a second pulse train (FR), the frequency of which ($f_R$) is dependent on the product of said constant frequency ($f_C$) and the latest maximum value (F) of the contents (G) of the counter unit (UDC), the counter unit (UDC) including means to reduce its contents (G) by a first quantity ($N_1$) in response to each pulse in the second pulse train (FR), another unit (PU) including means to supply the control unit (SCL) with a third pulse train (FX) with an unknown frequency ($f_x$), the control unit (SCL) including means to emit a control signal to the counter unit (UDC) for each pulse in the third pulse train, the counter unit (UDC) increasing its contents (G) by a second quantity ($N_2$) at the occurrence of said control signal, said second quantity ($N_2$) being greater than or equal to said first quantity ($N_1$), and after each such addition the contents (G) of the counter unit (UDC) having reached a new maximum value (F) which constitutes a digital representation of the frequency ($f_x$) of the second pulse train (FX).

2. Apparatus according to claim 1, in which the frequency ($f_R$) of the second pulse train (FR) is equal to the product of said constant frequency ($f_C$) and said maximum value (F) divided by a proportionality constant (M) which is greater than said maximum value (F).

3. Apparatus according to claim 1, which comprises a register unit (RL) connected between and to the counter unit (UDC) and the multiplying unit (DRM), said register unit including means to memorize a first maximum value ($F_k$) of the contents (G) in the counter unit (UDC) until a second maximum value ($F_{k+1}$) has been obtained.

4. Apparatus according to claim 1, in which the ratio between said first quantity ($N_1$) and said second quantity ($N_2$) is $10^p$, p being an integer.

5. Apparatus according to claim 1, in which the ratio between said first quantity ($N_1$) and said second quantity ($N_2$) is $16^q$, q being an integer.

* * * * *